(12) United States Patent
Sabzerou et al.

(10) Patent No.: US 11,871,711 B2
(45) Date of Patent: *Jan. 16, 2024

(54) ROOT TRELLIS FOR USE IN HYDROPONIC GROWING AND METHODS OF USING SAME

(71) Applicants: Nate Sabzerou, Los Angeles, CA (US); Jeffrey Neiman, Beverly Hills, CA (US)

(72) Inventors: Nate Sabzerou, Los Angeles, CA (US); Jeffrey Neiman, Beverly Hills, CA (US)

(*) Notice: Subject to any disclaimer, the term of this patent is extended or adjusted under 35 U.S.C. 154(b) by 83 days.

This patent is subject to a terminal disclaimer.

(21) Appl. No.: 16/025,673

(22) Filed: Jul. 2, 2018

(65) Prior Publication Data

US 2019/0008104 A1 Jan. 10, 2019

Related U.S. Application Data

(60) Provisional application No. 62/528,080, filed on Jul. 1, 2017.

(51) Int. Cl.
*A01G 31/02* (2006.01)
*A01G 29/00* (2006.01)
*A01G 9/12* (2006.01)

(52) U.S. Cl.
CPC .............. *A01G 31/02* (2013.01); *A01G 9/12* (2013.01); *A01G 29/00* (2013.01)

(58) Field of Classification Search
USPC ... 47/59 R–63, 66.7, 32, 32.7, 32.8, 78, 904
See application file for complete search history.

(56) References Cited

U.S. PATENT DOCUMENTS

| 923,663 | A | * | 6/1909 | Kroeger | A01G 9/02 |
| 1,725,373 | A | * | 8/1929 | Rosenwald | A47G 7/07 |
| | | | | | 47/41.13 |
| 2,960,798 | A | * | 11/1960 | Lindstaedt | A01G 9/029 |
| | | | | | 47/73 |

(Continued)

FOREIGN PATENT DOCUMENTS

| FR | 2304149 | * | 10/1976 | A47G 7/07 |
| JP | 08308382 A | * | 11/1996 | A01G 1/12 |

(Continued)

OTHER PUBLICATIONS

Root Trellis ™ from Mutliponics, Jun. 19, 2015, [retrieved from internet The Wayback Machine on Sep. 6, 2023, http://web.archive.org/web/20150619175449/http://multiponics.biz:80/products/root-trellis ] (2 pages plus 1 page of current date posting with picture) total 3 pages.*

*Primary Examiner* — Andrea M Valenti

(57) ABSTRACT

An apparatus and method is disclosed comprises a root trellis or use thereof. Specifically, a solid medium made from a non-corrosive material composed of a 3-dimensional solid grid for supporting and providing structure to a plant root's downward and lateral growth when roots are otherwise unsupported by a solid medium. The apparatus is potentially constricted with an attached appendage by which the trellis can suspend itself from the container or reservoir it is placed inside to maintain a functional shape, especially if the device composition material is not rigid enough to support its own shape.

1 Claim, 6 Drawing Sheets

(56) References Cited

U.S. PATENT DOCUMENTS

| | | | | |
|---|---|---|---|---|
| 2,982,051 A * | 5/1961 | Wheelock | ............... | A47G 7/07 47/41.13 |
| 3,698,132 A * | 10/1972 | Green | ............... | A01G 5/04 220/628 |
| 4,062,148 A * | 12/1977 | Edmonds, Jr. | ............... | A01G 23/04 47/76 |
| 4,255,896 A * | 3/1981 | Carl | ............... | A01G 31/06 47/62 C |
| 4,494,660 A * | 1/1985 | Hansen | ............... | B43K 23/002 47/41.13 |
| 4,843,757 A * | 7/1989 | O'Hara, Jr. | ............... | A01G 25/06 47/48.5 |
| D311,666 S * | 10/1990 | Burke | ............... | D8/1 |
| 5,025,590 A * | 6/1991 | Smith | ............... | A01G 23/04 206/423 |
| 5,311,700 A * | 5/1994 | Thomas | ............... | A01G 23/04 47/76 |
| 5,495,692 A * | 3/1996 | LoJacono, Jr. | ............... | A01G 23/04 220/485 |
| 6,085,461 A * | 7/2000 | Brisson | ............... | A47G 7/085 47/78 |
| 6,202,348 B1 * | 3/2001 | Reiger | ............... | A01G 9/026 47/73 |
| 6,219,966 B1 * | 4/2001 | Lapointe | ............... | A01G 31/02 47/62 C |
| D470,600 S * | 2/2003 | Cantley | ............... | D25/100 |
| 7,984,585 B1 * | 7/2011 | Wu | ............... | A01G 9/12 47/45 |
| D744,836 S * | 12/2015 | Sartor | ............... | D9/502 |
| 9,307,702 B1 * | 4/2016 | Lauer | ............... | A01G 23/04 |
| 9,398,746 B1 * | 7/2016 | Schweitzer | ............... | A01G 13/0237 |
| D807,130 S * | 1/2018 | Popa | ............... | D8/1 |
| 2003/0089037 A1 * | 5/2003 | Ware | ............... | A01G 31/02 47/83 |
| 2005/0274073 A1 * | 12/2005 | Brooke | ............... | A01G 31/02 47/59 R |
| 2009/0038219 A1 * | 2/2009 | Bitel | ............... | A01G 23/04 47/73 |
| 2011/0232190 A1 * | 9/2011 | Pindus | ............... | A01G 31/02 47/62 A |
| 2012/0005957 A1 * | 1/2012 | Downs, Sr. | ............... | A01G 31/02 47/62 A |
| 2014/0075841 A1 * | 3/2014 | Degraff | ............... | A01G 27/005 47/62 A |
| 2014/0290137 A1 * | 10/2014 | Nagels | ............... | A01G 31/06 47/62 R |
| 2015/0366148 A1 * | 12/2015 | Wielgosch | ............... | A01G 17/04 47/47 |
| 2017/0347533 A1 * | 12/2017 | Volin | ............... | A01G 27/005 |
| 2018/0054976 A1 * | 3/2018 | Uy | ............... | A01G 13/10 |
| 2018/0206421 A1 * | 7/2018 | Scott | ............... | A01G 31/02 |

FOREIGN PATENT DOCUMENTS

| | | | | |
|---|---|---|---|---|
| JP | | 11318217 A * | 11/1999 | ............... A01G 9/02 |
| WO | WO 2014/107761 | * | 7/2014 | ............... A01G 9/12 |

* cited by examiner

ROOT TRELLIS FOR USE IN HYDROPONIC GROWING AND METHODS OF USING SAME

STATEMENT OF RELATED APPLICATIONS

Priority

This application claims priority to U.S. Provisional Application No. 62/528,080.

TECHNICAL FIELD

The inventions disclosed herein generally relate to device used in cultivating plants and to plant cultivating methods. More specifically, it pertains to a root support apparatus for use in a hydroponic cultivation system and methods that utilizes a trellis structure for plant roots in hydroponic cultivation systems. In traditional hydroponic or aquaponic cultivating systems, a plant's roots, or section of the plant's roots, are not directly supported by a solid medium. The invention allows plant cultivation wherein roots are suspended within an aqueous solution and are supported by a medium permitting downward and lateral growth. The inventive root trellis structure results in a healthy branched root system, greater plant biomass, and an overall increase in plant yields than prior art hydroponic systems.

BACKGROUND OF THE INVENTION

For centuries, the production of plants has beat plagued with many difficulties associated with natural plant characteristics and the environment in which the plants are grown. Proper horticultural practices are necessary to minimize these problems and maximize plant growth and ensure viable production.

In time, commercial farms evolved to grow plants in organized rows. This practice facilitated planting, feeding, trimming, watering, maintenance and harvesting of plants or fixed products grown by the plants. However, problems also arose with this type of cultivation.

For example, some conventional growing practices utilize flood-type irrigation techniques and mass spraying of chemicals used to fumigate and fertilize. Flood irrigation and mass spraying, besides being wasteful of water and chemicals, has the potential to damage surface soils by promoting erosion and to damage sources of both groundwater and surface water with run-off of fertilizers and pesticide. This type a irrigation has also mated an increased amount of moisture in the soil, which causes stress to the plants.

Agricultural fields, especially those used year after year, are usually infested with harmful pests, that attach to the roots of plants. A field is typically fumigated to address this problem, but that may cause adverse environmental effects. Traditional cultivational methods in soil can be very wasteful of resources that are not focused on plant production and can have a harsh impact on the environment. Thus, there is a need for a device which allows plants to be cultivated in an efficient way without harsh environmental impacts.

On a smaller production scale, people grow plantar in outdoor gardens in the yards of their homes. A persistent problem with these types of home gardens is that plants take up a substantial amount of space. Such space requirements are inconvenient. Further, the failure to maximize the growth potential in limited outdoor spaces results in a reduced yield of crop.

Additionally, in order for successful plant growth in any setting, plants must be kept free from insect and small pests. Considerable time and expense is incurred preventing these issues and maintaining healthy growth. In addition to insects and pests, weeds can also be a concern. Failure to regularly maintain a growing space free of weeds and pests will decease the health of the plants.

Many methods for cultivating plants do not use, or only minimally use, a solid medium and, instead, use an aqueous solution as the plants' nutrient source. The nutrients dissolved into the aqueous solution are derived either from inorganic or organic sources. Such methods may be generally described as hydroponic cultivation methods. Hydroponic gardening is the growing of plants in nutrient solutions with or without an inert medium to provide mechanical support for the plant. The individual plants are supplied with the proper nutrients and water through a conduit system to enhance and promote plant growth under controlled conditions.

There are various techniques and methods for delivering the aqueous solution to the plant routs. A practitioner of hydroponic-cultivation methods often selects the preferred technique and method after considering the unique anatomy of the plant to be cultivated.

Techniques which may be commonly referred to as deep water culture, ebb and flow; and aeroponics provide a plant's rots with empty space to grow into, rather than utilizing a solid medium. This space is, periodically or continuously, filled with an aqueous solution, or the space is, continuously or periodically, misted with an aqueous solution. Such techniques are Wien used because it maximizes the surface area of the root winch is in direct contact with an absorbable, or useable, form nutrients as only dissolved compounds can be taken up by the plant's roots for purposes of the plum's metabolic function.

When grown hydroponically, plants will generally flourish in a manner superior growth in normal soil medium. This is, in part, because there is a greater availability of nutrients when supplied to the root with a hydroponic solution as opposed to a normal soil medium. Hydroponically grown plants begin growth quickly and grow faster than they would in a soil medium and fruits ripen earlier. Additionally, with hydroponic gardening, plants require less space in which to grow due to the fact that access to nutrients is not constrained, thereby permitting the plants to feed and breathe much more easily than they could in soil. However, benefits of the soil are typically lost when utilizing hydroponics, resulting in a less branched root systems, an underdeveloped root system.

Also, some traditional hydroponic techniques have utilized growth medium that is heavy when saturated, causing clogging when filled with plant roots, and/or requiring a great deal of maintenance.

Many hydroponic systems do not utilize or use a minimal amount of solid medium, either soil or inert. As such, much of the plants rhizospphere, root system, in hydroponic systems do not have a medium to support itself on. In addition, the lack of a medium in most or all of the system means there is no surface for the roots to bind to. The consequence of this is that the rhizosphere does not grow and develop as it does in a system which utilizes a solid medium.

Plaints obtain their necessary water and nutrients from the soil via their root systems. Equally important is the aeration of the root system. If oversaturated with water and without access to air, roots can rot. In addition diminished access to oxygen reduces metabolic activity of the roots, and the subsequent productivity of the roots, as plants require oxygen to break down the sugars they produce for energy. Therefore, air exposure, access to air, and airflow is vital to a vigorous plant as well. Thus, there is a need for a device which allows plants to be exposed to ideal airflow.

Growing crops hydroponically has many advantages. For example, hydroponics can help reduce our environmental footprint, cut costs, enhance food security, and overall be more convenient for both the fanner and consumer. Hydroponic cultivation has been previously used to grow vegetables, flowers, and other annual crops.

Hydroponically grown plants are often supported by a variety of substrates for the purpose of axially orientating the plant's shoots and roots often chosen by considering the anatomy of plant's roots and the preferred nutrient delivery method and subsequent irrigation system used by the cultivator.

The plants are supported by an inert medium which holds them upright. While, in some techniques, a plants' rots might come into contact with an inert medium, the medium's purpose is to provide the plant with support, maintaining an unchanged axis between the rout and shoot anatomy of the plant as the plant grows. These inert mediums are not used for the purpose of providing the touts with a geometrically pre-meditated structure for the roots to grow into. In addition, these mediums are not able to provide a constant and unchanging shape for the roots to grow into, as their usage in an aqueous solution and/or empty space is randomly determined by density and gravity, making existing inert hydroponic mediums ineffective as substrates which can also provide structure to developing roots.

In prior art plant-cultivation methods and techniques, a significant proportion of the root's biomass is unsupported by a solid medium. A plant's roots will take the must direct, and unconstrained path towards the aqueous solution, which in the methods described above is directly downwards, the direction of gravity. When the plant's roots' downward growth is constrained by a solid medium like soil, the plant's roots often have to grow laterally while they grow downward, which increases the total surface area of root biomass the plant can produce. However, when the roots are unconstrained, as occurs at least in some duration of the cultivation process as practiced by traditional hydroponic cultivation methods herein, lateral growth of the roots is not encouraged until the plants downward growth into the empty or aqueous space is constrained by they dimensions (tithe container the roots are growing into. This can likely produce layers of root mass which are denser and more tightly bound together at the bottom of the container than at the top. Such a phenomenon reduces the potential plant's root surface area in direct and constant contact with an aqueous solution or air than would likely otherwise occur over the same period of time if lateral growth of the roots were encouraged earlier, and if downward growth of the roots were more obstructed. Further, root biomass which is tightly bound together can reduce the air flow across the roots and reduce the surface area of the roots which are actively absorbing nutrients for the plant's metabolic needs. This can increase the risk of root borne diseases being contracted, reduce growth and phytochemical production, as well cause the plant to experience other phenomenon which can reduce health, productivity, and vigor.

Plants can produce much higher yields when the root systems are healthy, have adequate unobstructed airflow, and are supported. Although support devices for plants are well known, current devices in the motet do not provide the area to support plant's root systems. As most support devices on the market are to aid in allowing the plant to grow to maximum height and are focused on the upper-portion of the plant.

Frequently, typical support devices for plant growth are garden trellises and often made from interwoven pieces of wood, bamboo, metal or plastic, are coming to provide support to climbing plants and vines. Trellises and wire cages are conventionally employed to support the weight of the plant during growth and especially before harvest.

In potted confinement plants can flourish such that their leaves and blossoms extend out beyond the sin of the pot and spread excessively. In that case, trellises are also common structures for support such plant foliage and redirecting the plant growth upward. Trellises conventionally provide support by using a tying of the vines and/or stalks of the growing plants to the trellis. This is done directly to the posts or to a span of string stretched between supports thereby allowing climbing plants to bind themselves to the structure.

However, there is a continuing unmet need for an improved plant root support apparatus and a method which solves many of the problems associated with hydroponic cultivation techniques failing to maintain the benefits of soil cultivation, particularly supporting the rout system.

In other words, there is a need for a durable, space efficient, root trellis support device that can be used in hydroponic growing systems but maintains the benefits of soil growth. Prior inventions have addressed portions of the needs u high-density and high yield production of crops but have not addressed optimal characteristics as claimed in this invention.

Generally, in the past, successful hydroponic gardening systems have been largely confined to operations carried Out on a commercial scale because of the required over feeding and controlled temperature and lighting cycles. Another difficulty in attempting to carry out hydroponic gardening on a smaller scale has been the requirement fox a relatively large water supply with closely controlled pumping and circulation over predetermined time intervals. For example, water must be freely available to cheroot system, but it must be closely monitored in such a way that the root system in not unduly stressed d either by too much water or by permitting the growing media to dry out over extended periods of time. Thus, it is difficult to supply a constant ratio and concentration of nutrient matter. Also, a predetermined intensity and distribution of lighting for a predetermined time and periods over the growing surface is required as well.

Numerous commercial hydroponic gardening systems have been developed. However, many of these systems use specialized components that are not readily available, resulting in a high cost system that is not affordable to a home gardener. For instances, many hydroponic gardening systems use specialized growing chambers for the plants that are adapted specifically for use with a given hydroponic garden. These often contain separate water inlets and outlets and may even include water distribution tubes therein. These wing chambers must often be used with specialized troughs or channels through which the nutrient solution is circulated. The troughs or channels may also contain smaller tubing therein for conveying the nutrient solution. Gardening systems with these specialized components may be affordable by commercial growers, are often too expensive and elaborate for the home gardener. Additionally, are not as efficient or effective for all plants. It is an objective of the present invention, therefore, to provide hydroponic garden system and method incorporated a runt trellis structure which will provide both benefits of a hydroponic system while preserving the benefits from natural soil growth. Because it does not require specialized growing chambers and elaborate components, this apparatus will be more affordable to the average gardener.

One previous technique for the hydroponic growth of plants on a large scale makes use of a series of elongated troughs through which a nutrient solution containing the necessary growth-promoting substances is circulated. In these prior art systems, the nutrient solution normally enters each trough at one end and is discharged at the other end with the result that all or most of the nutrients tend to be consumed by the plaits nearest the end at which the solution is introduced to the detriment of the plants toward the discharge end. Often, there will be plainly evident a marked, steady decrease in plant size and yield from the inlet end to the discharge end of the trough.

In prior art hydroponic systems there is loose or no root support, only allowing roots to grown downward. As a result, plants have less biomass consequently less fluid and air contact. All of which prohibits optimal growth.

The prior art has nothing to enable optimal growth for plants by combining the benefits of hydroponic cultivation and soil cultivation. Among various factors substantially affecting plant growth is health of the root system and air exposure. Many existing hydroponic systems restrict and limit root systems. With this approach, the entire plant quality is reduced. Furthermore, in previous systems and methods the plants have not been adequately supported to reach optimal height. Thus, there is a need at present for a inure efficient and improved trellis support structure for plants grown with hydroponic means while maintaining benefits of the soil.

The prior art, such as U.S. Pat. No. 6,502,350, discloses an installation and method for hydroponic cultivation of plants as well as a plant support structure. A water reservoir feeds a water network of flow conduits leading to a plurality of upwardly extending plant support structures in the form of columns. Each column includes a series of rooting compartments containing rooting medium and extending over its heights. Each compartment has a wall provided with at least one opening for permitting the foliage of the plant rooted in the medium to protrude from the compartment. A drainage network of conduits leads from the rooting compartments to the reservoir and pump its providing for circulating water around the circuit formed by the reservoir, feed network, columns and drainage network. The pump intermittently circulates water around the circuit. However, this disclosure does not pertain to a root support apparatus as claimed herein.

U.S. Patent Application Publication No. 2006/0150497 discloses methods and components for the hydroponic cultivation of plant materials. The components include confined containers, a confined irrigation/fertigation system, field and plant sensors, a plant support system, and an overcoming structure. Each of these components used singularity or in combination with each Other enhances the growth and yield of plant material, decrease the costs of cultivation, and decry adverse environmental impacts. Again, a root support apparatus is not disclosed in this application.

U.S. Pat. No. 5,467,275 discloses a hydroponic garden utilizing conventional flower pots for growing chambers and plastic PVC pipe supporting the flower pots through openings in the upper wall of the pipe so that a nutrient solution circulating through the plastic pipe feeds the plants growing in the flower pots. A timer-controlled pump circulates the nutrient solution from a reservoir through the conduit and back to the reservoir according to a predetermined program. Again, a root support apparatus is lacking in this disclosure.

U.S. Pat. No. 9,532,517 discloses a self contained hydroponic plant system which can be easily packaged as a kit containing a plurality of plant seeds, at least one plant cube for holding seedlings within, a germination nay to allow the plant cubes having seeds within to germinate, a vertically collapsible reservoir for holding water and nutrients therein having an open top zed and sealed bottom end, a solar powered aerator for circulating oxygen to the water in the reservoir through a flexible hose, and a net pot supported by the top end of the reservoir having a slotted bottom wall for supporting the plant cups with germinated seedlings within, whereby the plant's root grow and access the plant nutrients within the aerated water filled reservoir. The kit further includes a media so support/stabilize the plant cup within the net pot, a frame assembly sized to hold the reservoir, and support hangers to suspend the frame assembly and reservoir. However, a root support apparatus is not disclosed.

Accordingly, it is desirable to have a root trellis support structure for use in hydroponic system that provides all of the benefits of soil growth that allows root growth in another direction besides down. This provides higher yields, stranger plants, plants with more biomass and overall more vigorous and healthy plants.

SUMMARY OF THE INVENTION

In the invention a structure for the rhizosphere to develop into as the roots enter the hydroponic solution is provided. The structure winch the root trellis provides, is composed of a solid surface for additional support in the space in which the roots are growing. The roots can tear the surface to expand and fill the container in which they are growing.

The invention will facilitate growth in cultivation systems in which an organism's roots are not supported by a substrate or any sort of physical structure. By enabling the development of more robust rhizosphere, cultivated organisms should achieve more productive growth. This will benefit, but not exclusively, those involved with or an horticulture, gardening and farming.

The present invention addresses the need in the art for an apparatus that can increase rout biomass, decreasing the prevalence of root borne diseases, increasing plant yield, increasing nutrient and water uptake, increase of phytochemical production, all while being cultivated hydroponically.

The one embodiment the invention comprises a method that entails placing plants within a container, and potentially a medium, which supports the axial orientation of the plant, so that roots grow into the container in which the air and/or aqueous solutions can directly and continuously contact the roots surface area, and wherein the roots shape and downward growth is constrained by a solid medium for the purpose of providing a pre-meditated direction for the growth of a plants roots, and providing a subsequent non-random expectation of roots structure over time.

The present invention of the cultivating device comprises a 3-dimensional grid-like trellis structure, composed of an inert, solid material like plastic, which ills the volume of container in which the roots grow. It one embodiment invention has one or more flexible appendages attached from opposite positions from one another for the purpose of anchoring the invention to the container it is placed within. Such a Component would be used if the material the invention was composed of was otherwise unable to support its own structure in an aqueous or solution, and against the force of gravity.

According to the cultivation method and the accompanying present invention, roots of the plant will grow into a more evenly spaced and productive root mass by utilizing the shape of the root trellis as directional guides for future root growth. As the anatomy of every plants' roots varies, and because there are various forms by which one can configure a plant cultivation method that performs the function described in this application, the specific geometry angles, size, and density (the size of the empty space of each grid within the 3 dimensional lattice network) of the invention do not need to be specified in order for the product to fulfill the function ascribed to the invention herein.

In the preferred embodiment, the cylindrical container is 14 inches high and 10 inches in diameter. The net sheets inside of the cylindrical container are spaced 2.25 inches apart beginning front the bottom of the container After the last net sheet theta is approximately 6.5 inches to the top of the container.

The invention solves many problems present in the prior art. It results in more efficient growth and higher plant yield and greater biomass. Through the invention one can maintain all of the benefits of hydroponic cultivation while simultaneously not losing benefits of soil cultivation. The results of the support, trellis include, but are not limited to, increased root biomass, decreasing the prevalence of root borne diseases, increasing plant yield, increasing nutrient and water uptake, increase of phytochemical production.

A benefit of the disclosed invention is that the confined hydroponic system, by continually providing the optimum nutrients to a plant throughout its life, results in harvested plant material having increased nutrients. Thus, the crop of the plant or other plant material is also of a better quality from a nutritional standpoint.

It is a further object of the present invention to provide an improved trellis support structure, specifically a trellis support structure for the roots of plants, utilizing a hydroponic system while maintaining benefits of the soil which is of a durable, reliable, and affordable construction. It is a further object of the present invention to provide an improved root trellis support structure utilizing a hydroponic system while maintaining benefits of the soil which may be easily manufactured and marketed. Another object of the present invention is to provide a more efficient gardening apparatus which allows plants to be grown indoors in all seasons and in all weather conditions.

This together with detailed features of the invention are pointed out in the drawings and brief description of the drawings. For a better understanding of the invention, its advantages, and specifics, reference should be had to the accompanying drawings and descriptive matter.

DETAILED DESCRIPTION OF THE PREFERRED EMBODIMENTS

Figure 1A:
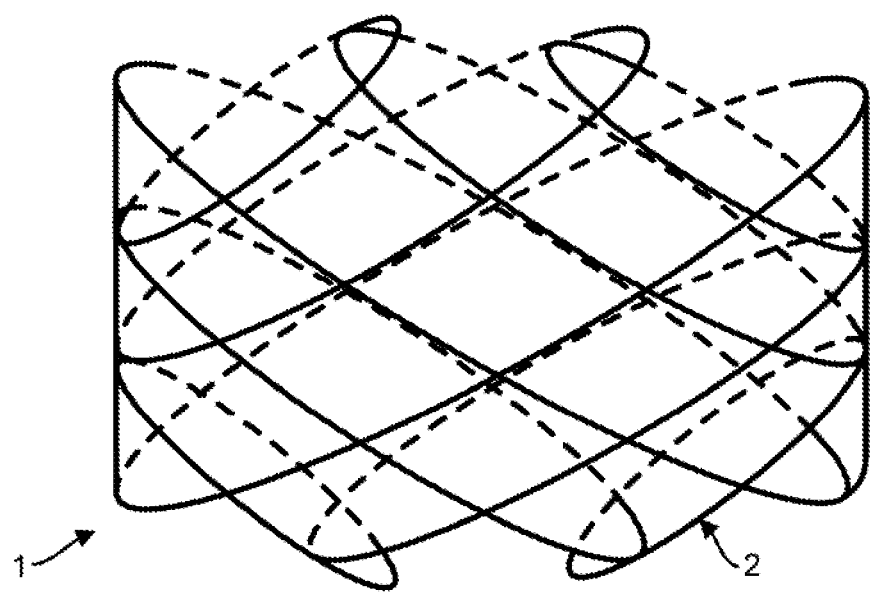
FIG. 1A is a cross section an embodiment of the roost trellis showing depth.
Figure 1B:
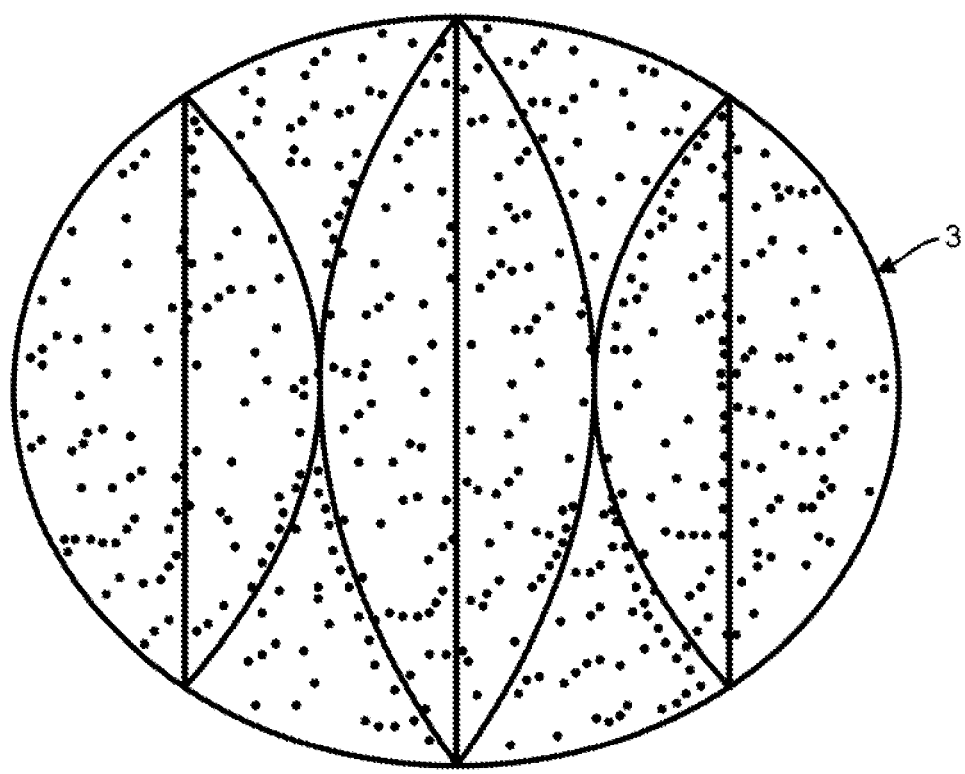
FIG. 1B is an overview an embodiment of the root trellis.
Figure 1C:
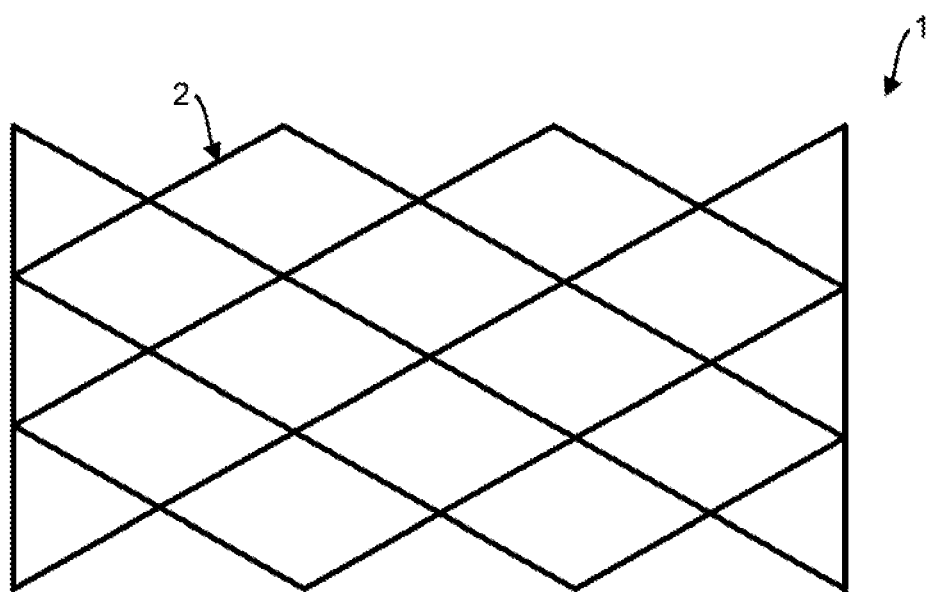
FIG. 1C is a cross section an embodiment of the root trellis.

An embodiment of the invention is disclosed in FIG. 1 and FIG. 2. FIGS. 1A and 1C describe the grid-like lattice shape of an embodiment of the inventive root trellis in order. The trellis [1] can be composed of an inert material such as plastic. In one embodiment, the trellis [1] can be composed of a nutrient providing material. The trellis [1] has support structur [2] that are operable to support root growth of plants in a hydroponic system. The overview of FIG. 1B shows that the inventive trellis [1] is operable to fit within and intersect the empty space within the lamer container [3] to provide the roots with support, without interfering with the dynamics of the irrigation methodologies employed by the practitioners of the hydroponic cultivation methodologies implemented within.

Figure 2A:
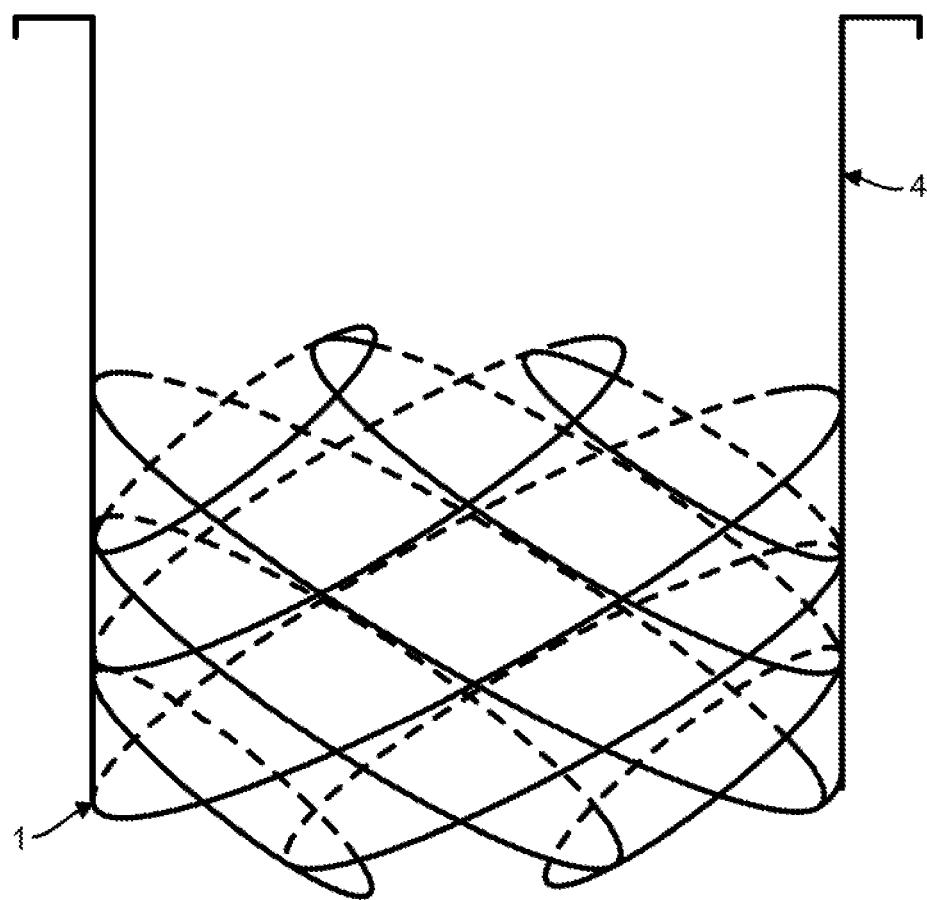
FIG. 2A is a cross section of an embodiment the root trellis with its anchor ng appendages showing depth.
Figure 2B:
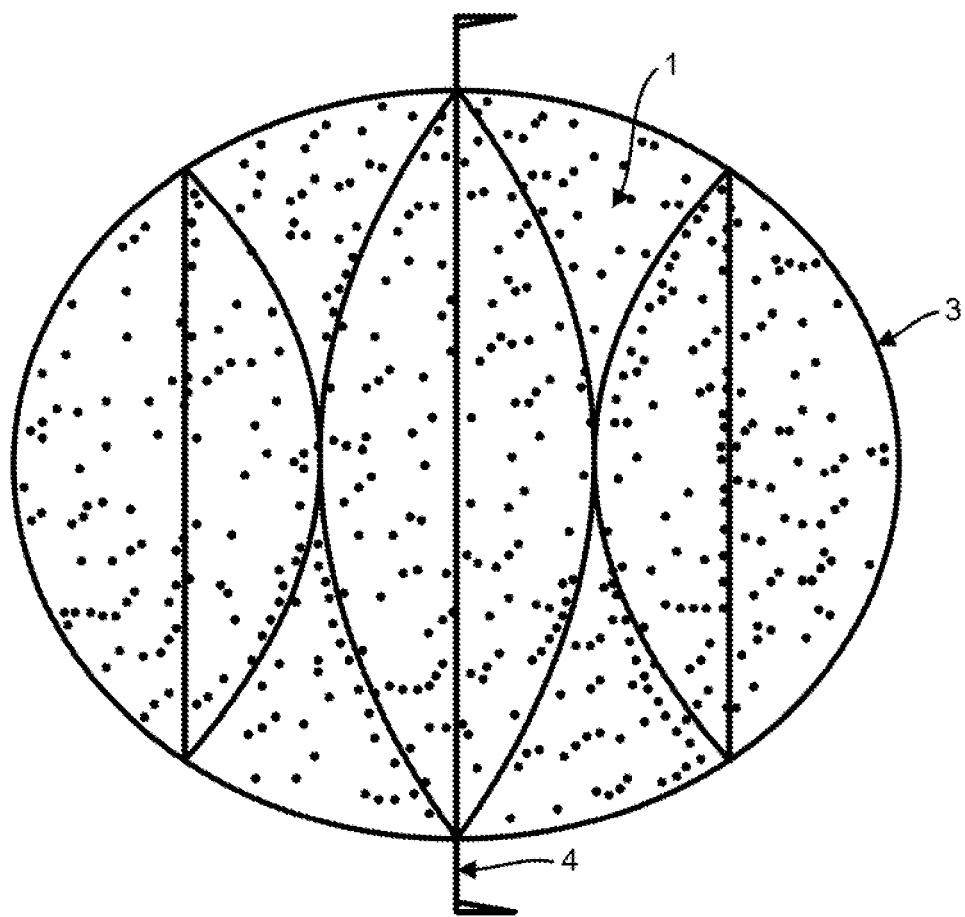
FIG. 2B is an anal view of an embodiment of the root trellis with its anchoring appendages.
Figure 2C:
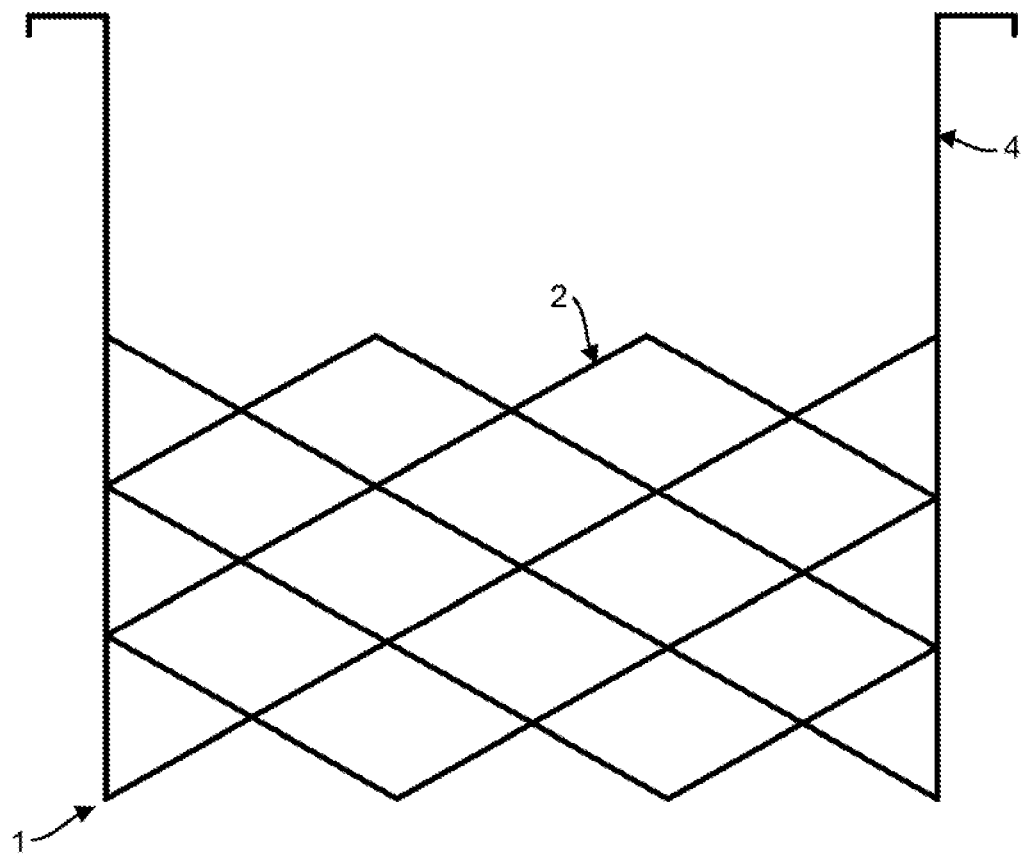
FIG. 2C is a cross section of an embodiment of the root trellis with its anchoring appendages.

FIGS. 2A and 2C describe the grid-like lattice shape of an embodiment of the root trellis [1] but also shows the anchoring appendages [4] attached to the top of the root trellis. FIG. 2B shows how a root trellis [1] with the anchoring appendages [ ] functioning to fill the empty space of the container [3], and how the functional usage of the anchoring appendage does not affect such function.

In one embodiment the inventive root trellis is composed of a material which does not break down in an organic solution. The trellis can be integrated into the container in which an organism with roots, such as plants, are being grown. When integrated, the product interacts with the roots which are unsupported by a growing medium, sod or inert, or otherwise. This could be, but not limited to, when the roots are exposed to air within a container, or if they are exposed to a hydroponic solution within a container, Certain effects of the invention include, but are not limited to, potentially allowing the roots to grow in a lateral direction simultaneous to the natural downward growth of the roots. This will allow the plants rhizosphere, root system, to utilize a greater volume of the potential space within the container they are growing inside of. In one embodiment the inventive trellis suspended within the container through tensional force between the trellis and the side walls of the container.

In one embodiment the overall specifications of the cylindrical container are 14 inches high and 10 inches in diameter. The support structures of the trellis are spaced 2.25 inches apart beginning from the bottom of the container. After the topmost support structure there is approximately 6.5 inches to the top of the container.

The root trellis system is comprised of a series of parallel support structures. These support structures are arranged inn way where the respective structures intersect one another and fit inside of the cylindrical container to form a lattice.

The present invention is advantageous in that is can be used both indoors and outdoors. When used indoors in can allow plants to be grown year-round in all seasons and in all weather conditions.

It should be understood that various changes and modifications to the preferred embodiments described heroin will be apparent to those skilled in the art. Other changes and modification, such as those expressed here, or others left unexpressed but apparent to those of ordinary skill in the art, can be made without departing from the spirit and scope of the present invention and without diminishing its attendant advantages. It is, therefore, intended that such changes and modifications be covered by the following claims.

Moreover, the invention as disclosed herein, may be suitably practiced in the absence of the specific elements which are disclosed herein.

What is claimed is:

1. A root trellis for promoting plant root growth in the roots of a plant growing in a root container of a hydroponic growing system comprising:
    a 3-dimensional grid-like lattice structure;
    wherein said 3-dimensional grid-like lattice structure is comprised of multiple support structures;
    wherein each of said multiple support structures is configured to intersect at least one other of said multiple support structures;
    wherein each of said multiple support structures is configured to be parallel to at least one other multiple support structures; wherein said multiple support structures are uniformly layered in two different angled orientations to create the intersecting and parallel configuration;
    wherein said 3-dimensional grid like lattice structure comprises empty spaces between said each of said multiple support structures allowing the flow of nutrients through said 3-dimensional grid like lattice structure; wherein the distance between each support structure and the nearest other parallel support structure is at least 2.25 inches;
    wherein said 3-dimensional grid-like lattice structure is configured to support the roots of a plant growing within a container of a hydroponic growing system such that said roots may grow in downward and lateral directions;
    wherein said 3-dimensional grid-like structure is configured to fit within and intersect across a space defined by the bottom two thirds of said container; and
    wherein said 3-dimensional grid like structure further comprises one or more anchoring appendages configured to attach to a rim of said container.

* * * * *